United States Patent

Miyashita et al.

[11] Patent Number: 5,997,717
[45] Date of Patent: Dec. 7, 1999

[54] ELECTROLYZED FUNCTIONAL WATER, AND PRODUCTION PROCESS AND PRODUCTION APPARATUS THEREOF

[75] Inventors: Kohichi Miyashita; Keiji Nagano; Toshikazu Nakamura, all of Wako, Japan

[73] Assignee: Honda Giken Kogyo Kabushiki Kaisha, Tokyo, Japan

[21] Appl. No.: 08/966,422

[22] Filed: Nov. 7, 1997

[30] Foreign Application Priority Data

Nov. 7, 1996 [JP] Japan ................................ 8-294951
Jun. 13, 1997 [JP] Japan ................................ 9-157003

[51] Int. Cl.⁶ .................................................. C02F 1/461
[52] U.S. Cl. ...................... 205/466; 205/702; 205/746; 204/252; 204/263
[58] Field of Search ................................ 205/746, 702, 205/770, 466; 204/252, 263

[56] References Cited

U.S. PATENT DOCUMENTS

| 2,535,035 | 12/1950 | Briggs | 205/746 |
| 3,764,499 | 10/1973 | Okubo et al. | 205/746 |
| 4,048,032 | 9/1977 | Eibl | 205/701 |
| 5,057,198 | 10/1991 | Bochkabev et al. | |
| 5,510,009 | 4/1996 | Arai et al. | 204/229.6 |
| 5,628,888 | 5/1997 | Bakhir et al. | |
| 5,728,274 | 3/1998 | Kamitani et al. | 204/229.6 |

FOREIGN PATENT DOCUMENTS

| 0474936A1 | 3/1992 | European Pat. Off. |
| 4330518A1 | 3/1995 | Germany |
| 6312183A | 11/1994 | Japan |
| 07100463 | 4/1995 | Japan |
| 08192158 | 7/1996 | Japan |
| WO9813304A1 | 4/1998 | WIPO |

*Primary Examiner*—Arun S. Phasge
*Attorney, Agent, or Firm*—Birch, Stewart, Kolasch & Birch, LLP

[57] ABSTRACT

Disclosed herein is electrolyzed functional water produced by the process comprising a step of feeding water containing electrolytes to a first electrolytic cell equipped with an anode, a cathode and an ion-permeable membrane between them to electrolyze it, and a step of electrolyzing the electrolyzed water obtained from the cathodic side of the first electrolytic cell on the anodic side of a second electrolytic cell equipped with an anode, a cathode and an ion-permeable membrane between them. Production processes and production apparatus of the electrolyzed functional water are also disclosed.

16 Claims, 4 Drawing Sheets

ELECTROLYZED FUNCTIONAL WATER, AND PRODUCTION PROCESS AND PRODUCTION APPARATUS THEREOF

BACKGROUND OF THE INVENTION

1. Field of the Invention

The present invention relates to electrolyzed functional water having oxidizing ability, which is suitable for use in general sterilization and disinfection, sterilization and disinfection of soil, crops and plants, and the like, and to production processes and production apparatus thereof.

2. Description of the Background Art

There has heretofore been known a process in which raw water containing a chloride such as sodium chloride (NaCl) and/or potassium chloride (KCl) as electrolyte is fed to an electrolytic cell equipped with an anode, a cathode and an ion-permeable membrane between them to electrolyze it, thereby producing electrolyzed functional water from an anodic side, which is suitable for use as a bactericide, a sterilizer and a disinfectant.

According to the above conventional process, the electrolyzed functional water obtained from the anodic side contains electrolyzed products such as chlorine ($Cl_2$), hypochlorous acid (HClO), chlorine oxide ($ClO^-$) and the like.

The electrolyzed functional water has strong sterilizing ability from the effect of chlorine, chlorine oxide and hypochlorous acid in particular.

However, the electrolyzed functional water obtained by the conventional production process has the disadvantage of no sufficient bactericidal effect against chlorine-resistant germs, because its sterilizing ability is due to the above-described chlorine or chlorine compounds.

Further, the electrolyzed functional water has a high concentration of chlorine with a low pH at the same time, so that it tends to diffuse a toxic chlorine gas into the atmosphere. Therefore, it is necessary to take care to use it in a closed room or the like.

SUMMARY OF THE INVENTION

Accordingly, it is an object of the present invention to remove the above-described disadvantages to provide electrolyzed functional water, which is expected to have a bactericidal effect against chlorine-resistant germs and contains a low concentration of chlorine to control diffusing the chlorine gas, and production processes and production apparatus thereof.

The above object can be achieved by the present invention described below.

According to the present invention, the electrolyzed functional water is obtained by feeding raw water containing electrolytes to a first electrolytic cell equipped with an anode, a cathode and an ion-permeable membrane between them to electrolyze it and then electrolyzing the electrolyzed water obtained from the cathodic side in the first electrolytic cell on the anodic side in a second electrolytic cell equipped with an anode, a cathode and an ion-permeable membrane between them.

The electrolyzed functional water according to the present invention can be advantageously produced by a production process according to the first aspect of the present invention. Namely, raw water containing electrolytes is first continuously fed to a first electrolytic cell equipped with an anode, a cathode and an ion-permeable membrane between them to electrolyze it. The electrolyzed water obtained on the cathodic side in the first electrolytic cell is continuously taken out and continuously fed to the anodic side in a second electrolytic cell equipped with an anode, a cathode and an ion-permeable membrane between them, thereby electrolyzing it. The electrolyzed functional water thus produced is continuously taken out from the anodic side in the second electrolytic cell.

The electrolyzed functional water according to the present invention can also be produced by a production process according to the second aspect of the present invention. Namely, raw water containing electrolytes is first fed to an electrolytic cell equipped with an anode, a cathode and an ion-permeable membrane between them to electrolyze it. After completion of the first electrolysis, the polarities of electric currents applied to the anode and cathode in said electrolytic cell are reversely switched over to electrolyze the electrolyzed water again. The electrolyzed functional water thus obtained is taken out from the anodic side in the second electrolyzing step.

Usually, natural water can be electrolyzed because of containing various kinds of ions such as a chloride ion, sulfate ion, sodium ion, potassium ion, etc.

Accordingly, in the present invention, any water such as tap water, industrial water or well water may be used as the raw water for electrolysis so far as it contains some electrolytes. However, it is preferable to add electrolytes such as a chloride for the successful electrolysis.

Sodium chloride (NaCl) or potassium chloride (KCl) may be preferably used to add as electrolytes. Sodium chloride is very low cost, while potassium chloride causes the electrolyzed functional water to contain potassium which is useful as a fertilizer when the electrolyzed functional water is used for a soil disinfectant and the like.

In addition of electrolytes to water, it is preferably added at a concentration ranging from 0.001 to 1 mol/liter. If the concentration is lower than 0.001 mol/liter, it is not enough to improve the electrolyzing efficiency. On the other hand, if the concentration is higher than 1 mol/liter, the electrolyzing efficiency is not improved markedly, and a large amount of electrolytes come to remain in electrolyzed water formed, and the remaining electrolytes exert bad influence upon something indirectly when the electrolyzed functional water is used.

According to the production process of the first or second aspect of the present invention, first of all, water is electrolyzed to generate oxygen ($O_2$) and a hydrogen ion ($H^+$) on the anodic side of the electrolytic cell in the first electrolyzing step. When water contains a chloride (or chloride ion), the chloride ions ($Cl^-$) are oxidized to generate chlorine ($Cl_2$), and a part of chlorine is dissolved in water to produce chlorine compounds (including ions) such as hypochlorous acid, and the other part thereof and the generated oxygen diffuse to atmosphere as gas from the electrolytic cell. The reactions on the anodic side of the electrolytic cell are as follows:

$H_2O \rightarrow \frac{1}{2}O_2 + 2H^+ + 2e^-$ (1)

$2Cl^- \rightarrow Cl_2 + 2e^-$ (2)

$Cl_2 + H_2O = H^+ + Cl^- + HClO$ (3)

$HClO = H^+ + ClO^-$ (4)

$ClO^- + 2HClO \rightarrow ClO_3^- + 2H^+ + 2Cl^-$ (5)

On the cathodic side, on the other hand, water is electrolyzed to generate hydrogen and a hydroxide ion ($OH^-$). The reaction on the cathodic side of the electrolytic cell is as follows:

$2H_2O+2e^-\rightarrow 2OH^-+H_2$ (6)

As a result, acidic water containing chlorine and chlorine compounds is obtained from the anodic side of the electrolytic cell, while alkaline water is obtained from the cathodic side.

When the alkaline electrolyzed water obtained from the cathodic side in the first electrolyzing step is then electrolyzed again on the anodic side of an electrolytic cell in the second electrolyzing step, oxygen is generated, and hydrogen peroxide ($H_2O_2$) and oxygen are produced from the hydroxide ion. The reactions on the anodic side in the second electrolyzing step are as follows:

$H_2O \rightarrow \frac{1}{2}O_2 + 2H^+ + 2e^-$ (7)

$2OH^- \rightarrow H_2O_2 + 2e^-$ (8)

$2OH^- \rightarrow H_2O + \frac{1}{2}O_2 + 2e^-$ (9)

$2Cl^- \rightarrow Cl_2 + 2e^-$ (10)

As a result, the electrolyzed functional water according to the present invention is obtained from the anodic side of the electrolytic cell in the second electrolyzing step.

The electrolyzed functional water according to the present invention has strong oxidizing ability due to nascent oxygen ([O]), superoxide and OH radical (.OH) generated from hydrogen peroxide, so that it has excellent effects on sterilization, disinfection, deodorization and the like. In addition, the above hydrogen oxide, superoxide and OH radical can be expected to have a bactericidal effect against chlorine-resistant germs.

Further, the hydrogen oxide is decomposed into only oxygen and water ($H_2O$), and so it is not toxic and safety even after the reaction. Therefore, the electrolyzed functional water according to the present invention can also be used in sterilization and disinfection of tableware and the like.

Incidentally, when a chloride is present as an electrolyte in the raw water, the chloride ion remains in the alkaline water obtained from the cathodic side of the electrolytic cell in the first electrolyzing step, and so small amounts of chlorine, hypochlorous acid and the like are produced from the chloride ion as shown in the reaction (10) in the anodic side of the cell in the second electrolyzing step.

Accordingly, the electrolyzed functional water contains small amounts of the chlorine compounds.

However, the chlorine compounds are unavoidably produced from the remaining chloride ion in the alkaline water by electrolysis, and so the residual chlorine concentration is low. Therefore, the electrolyzed functional water according to the present invention diffuses a small amount of a chlorine gas even when the chloride is present as the electrolyte in the raw water.

On the other hand, hydrogen peroxide is relatively stable in an acid region, and on the contrary hypochlorous acid has high activities against bactericidal action and the like in the acid region. Further, in an alkaline region, hydrogen peroxide is more active and hypochlorous acid is relatively stable. It is further expected that the OH radical is produced by the action of hypochlorous acid and hydrogen peroxide. Accordingly, the electrolyzed functional water according to the present invention is expected to have a synergistic effect of the small amount of chlorine compounds and the hydrogen peroxide when a chloride is present as the electrolyte in the raw water.

According to the production process of the first aspect of the present invention, the raw water continuously fed to the first electrolytic cell is electrolyzed in the first electrolyzing step, and the alkaline electrolyzed water is continuously taken out from the cathodic side of the first electrolytic cell. The electrolyzed water is then continuously fed to the anodic side of the second electrolytic cell and electrolyzed in the second electrolyzing step, whereby the electrolyzed functional water according to the present invention can be continuously taken out from the anodic side of the second electrolytic cell.

In the production process of the first aspect, supplying water to the cathodic side of the second electrolytic cell can be the raw water or the acidic water from the first electrolytic cell which is fed continuously into the cathodic side of the second electrolytic cell.

When a chloride is present as the electrolyte in the raw water, the electrolyzed water containing chlorine and chlorine compounds such as hypochlorous acid is obtained on the anodic side of the first electrolytic cell. The above acidic electrolyzed water is electrolyzed again on the cathodic side of the second electrolytic cell, whereby the water comes to indicate a pH range between weak acidity and weak alkalinity. The chlorine compounds, in particular, hypochlorous acid is known to be stable and to exhibit a bleaching action and a bactericidal action in an alkaline region. In the second electrolyzing step, it is possible to control the pH of the electrolyzed water formed to some extent by adjusting the intensity of electrolysis, so that the pH of the electrolyzed water containing the chlorine and the chlorine compounds such as hypochlorous acid can be controlled to a weakly alkaline.

Accordingly, in the case where the chloride is present as the electrolyte in the raw water, according to the production process of the first aspect, the electrolyzed water from the anodic side of the first electrolytic cell is continuously taken out and fed to the cathodic side of the second electrolytic cell in the second electrolyzing step, whereby the water solution exhibiting a bleaching reaction and the like can be continuously taken out as a by-product of the electrolyzed functional water from the cathodic side of the second electrolytic cell.

According to the production process of the second aspect of the present invention, the cathodic side of the electrolytic cell in the first electrolyzing step is switched to an anodic side in the second electrolyzing step, so that there is no need to transfer the electrolyzed water obtained in the first electrolyzing step. Therefore, the production process is operated in one electrolytic cell, and the apparatus can be simplified.

According to the production process of the second aspect of the present invention, the electrolyzed water on the anodic side of the electrolytic cell in the first electrolyzing step is electrolyzed again on the cathodic side of the electrolytic cell in the second electrolyzing step without transferring the electrolyzed water. Therefore, the water solution exhibiting a bleaching reaction can be taken out as a by-product of the electrolyzed functional water from the cathodic side in the second electrolyzing step when a chloride is present as the electrolyte in the raw water.

The electrolyzed functional water of the present invention has high oxidizing ability in a weakly acidic to weakly alkaline region and is hence easy to use, unlike the conventional electrolyzed functional water having a strong acidity. Therefore, a feature of the production process according to the first or second aspect is that the electrolyzed functional water containing hydrogen peroxide and controlled to pH range within 3.5 to 10.5 can be produced by controlling the electrolytic conditions in the second electrolyzing step. The controlling method of the electrolytic conditions includes a method of controlling the quantity of electric charge applied between the anode electrode and the cathode electrode.

Further, the electrolyzed functional water according to the present invention can also be produced by a production process according to the third aspect of the present invention. Namely, raw water containing electrolytes is continuously fed to the cathodic side of an electrolytic cell equipped with an anode, a cathode and an ion-permeable membrane between them to electrolyze it. The electrolyzed water is continuously taken out from the cathodic side of the electrolytic cell and fed to the anodic side of the electrolytic cell, whereby the electrolyzed water is electrolyzed together with new raw water fed to the cathodic side. Then, the electrolyzed functional water is continuously taken out from the anodic side of the electrolytic cell.

According to the production process of the third aspect, hydrogen is generated and a hydroxide ion ($OH^-$) is formed on the cathodic side by electrolysis mainly of the water. As a result, alkaline electrolyzed water is obtained in accordance with the reaction (6).

On the anodic side of the electrolytic cell on the other hand, oxygen ($O_2$) and a hydrogen ion are generated by electrolysis mainly of the water as shown in the reaction (1) at the initial stage of the electrolysis. However, the acidic water produced at the initial stage of the electrolysis is quickly replaced by the alkaline electrolyzed water produced on the cathodic side because the alkaline electrolyzed water continuously is fed into the anodic side. Incidentally, when the raw water contains a chloride (chloride ion) as an electrolyte, the chloride ion is simultaneously oxidized into chlorine ($Cl_2$) at this time.

When the raw water on the anodic side of the electrolytic cell is then completely replaced by the alkaline electrolyzed water from the cathodic side, the alkaline electrolyzed water is electrolyzed on the anodic side, and new raw water is electrolyzed on the cathodic side.

As a result, the reaction (6) takes place on the cathodic side in the same manner as described above to generate hydrogen and a hydroxide ion ($OH^-$), while on the anodic side, as shown by the reactions (7) to (9), the electrolysis of the water takes place, and at the same time hydrogen peroxide ($H_2O_2$) and oxygen are produced from the hydroxide ion contained in the electrolyzed water from the cathodic side. Then, the electrolyzed functional water according to the present invention is obtained from the anodic side.

When the raw water contains a chloride (chloride ion) as an electrolyte, Cl– (chloride ion) contained in the alkaline water fed to the anodic side is also oxidized at the same time.

Accordingly, in the electrolytic water obtained, hypochlorous acid stable in a neutral pH region comes to coexist as a chlorine component. However, the diffusion of a chlorine in this pH region is smaller than that of conventional electrolyzed water.

In the production process of the first or second aspect, the electrolyzed functional water is taken out from the anodic side in the second electrolyzing step after the 2-steps of electrolyzing process. Therefore, a half quantity of the raw water fed is converted into the electrolyzed functional water.

In the production process of the third aspect of the present invention on the other hand, once the raw water on the anodic side of the electrolytic cell is replaced by the alkaline electrolyzed water from the cathodic side, the alkaline electrolyzed water from the cathodic side is continuously fed to the anodic side after this, and so the electrolyzed functional water can be continuously taken out from the anodic side.

After the raw water on the anodic side is replaced by the electrolyzed water from the cathodic side, the whole quantity of the raw water fed to the cathodic side can be converted into the electrolyzed functional water containing hydrogen peroxide. Therefore, the yield of production can be enhanced.

Further in the production process of the third aspect of the present invention, the electrolysis by which the electrolyzed functional water is produced is conducted on the anodic side, and at the same time the electrolysis by which the alkaline electrolyzed water to be fed to the anodic side is produced is conducted on the cathodic side. Therefore, the yield of the electrolyzed functional water per supplied electric power is heightened.

The production process of the third aspect can be performed by means of a production apparatus comprising an electrolytic cell equipped with an anode, a cathode and an ion-permeable membrane between them, a raw water feeding means for continuously feeding raw water containing electrolytes to the cathodic side of the electrolytic cell, an electrolyzed water feeding means for continuously feeding the electrolyzed water taken out from the cathodic side of the electrolytic cell to the anodic side of the electrolytic cell, and an electrolyzed functional water taking-out means for continuously taking out electrolyzed functional water from the anodic side of the electrolytic cell.

When an electrolytic cell is continuously used for a long period of time, in general, the electrolytic efficiency decreases gradually, due to deposition of scale on the electrodes as the electrolyzed by-products. In order to prevent the successive diminution of the electrolytic efficiency due to the adhesion of the scale, it is only necessary to conduct electrolysis with the polarities of electric currents applied to the anode and the cathode reversed periodically, thereby removing the scale. However, such a method involves a problem that the production of the electrolyzed functional water is intermitted during the cleaning of the electrodes.

Therefore, another production apparatus suitable for the production process of the third aspect comprises an electrolytic cell equipped with first and second electrodes and an ion-permeable membrane between them, the polarities of said electrodes being reversible; a first flow path composed of a first raw water feeding means for continuously feeding raw water containing electrolytes to the side of the first electrode when the first electrode is used as a cathode, a first electrolyzed water feeding means for continuously feeding the electrolyzed water from the side of the first electrode to the side of the second electrode, and a first electrolyzed functional water taking-out means for continuously taking out electrolyzed functional water from the side of the second electrode; a second flow path composed of a second raw water feeding means for continuously feeding raw water containing electrolytes to the side of the second electrode when the second electrode is used as a cathode, a second electrolyzed water feeding means for continuously feeding the electrolyzed water from the side of the second electrode to the side of the first electrode, and a second electrolyzed functional water taking-out means for continuously taking out electrolyzed functional water from the side of the first electrode; and a change-over means for changing a flow path over to the first flow path when the first electrode is used as a cathode or over to the second flow path when the second electrode is used as a cathode.

According to the apparatus of the above construction, the two flow paths are provided so as to change over the flow path according to the polarities of said both electrodes, so that the production of the electrolyzed functional water can be continued even when the polarities of said both electrodes are reversed to remove scale deposited to the surfaces of the electrodes.

In the production process and production apparatus according to the third aspect of the present invention, any water may be used as the raw water fed to the electrolytic cell so far as it contains electrolytes. However, it is preferable to add electrolytes such as a chloride for the purpose of successfully conducting the electrolysis. Sodium chloride (NaCl) or potassium chloride (KCl) may be used as the electrolytes.

The above and other objects, features and advantages of the present invention will be readily appreciated as the same becomes better understood from the preferred embodiments of the present invention, which will be described subsequently in detail with reference to the accompanying drawings, and from the appended claims.

DETAILED DESCRIPTION OF THE PREFERRED EMBODIMENTS

The embodiments of the present invention will hereinafter be described in more detail with reference to the accompanying drawings.

The first embodiment of the present invention will be first described.

Figure 1:
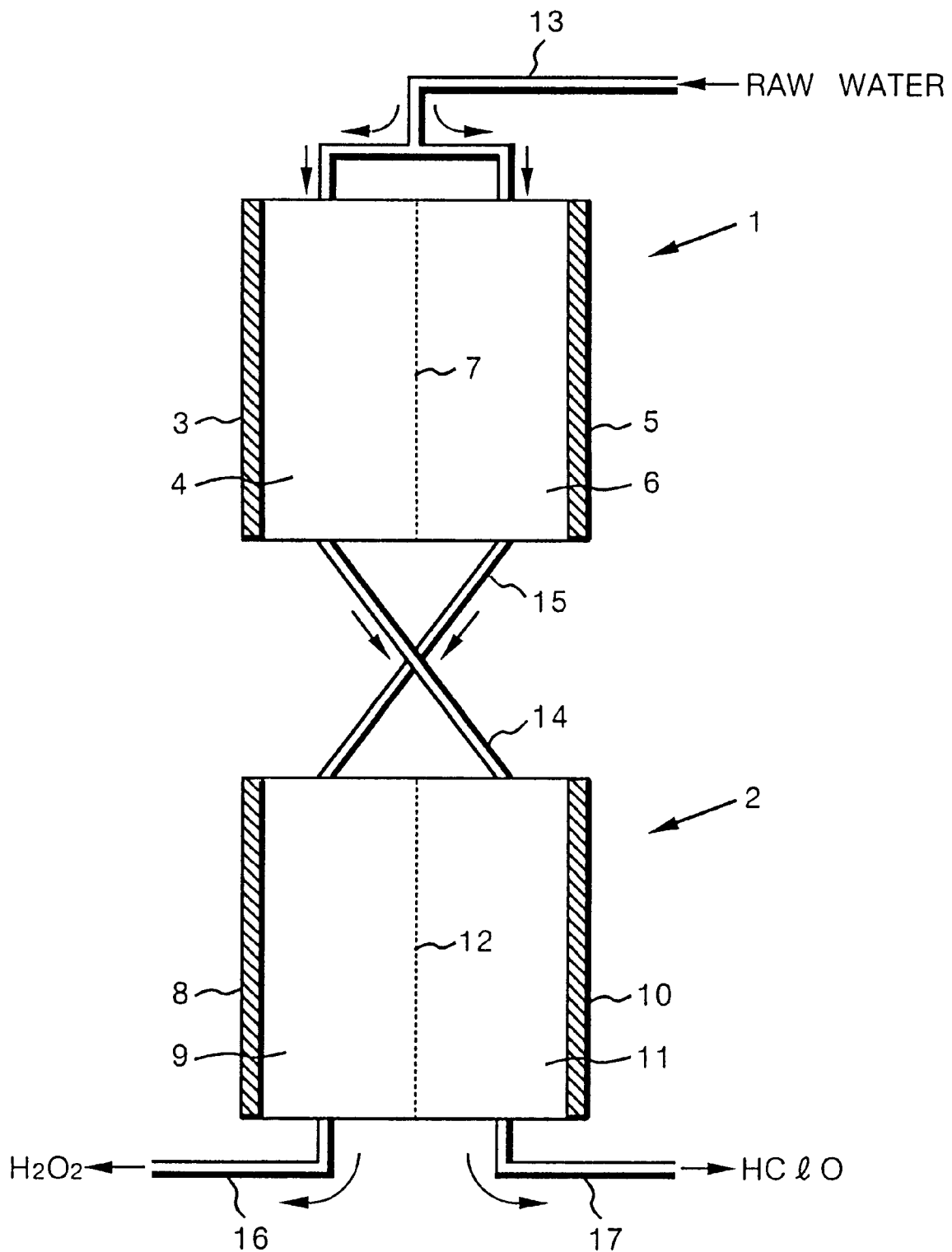
FIG. 1 is a cross-sectional view illustrating an example of an apparatus used in the production process according to the first aspect of the present invention.

This embodiment describes the first production process of the present invention. As illustrated in FIG. 1, an apparatus used in this production process includes a first electrolytic cell 1 and a second electrolytic cell 2. The first electrolytic cell 1 is so constructed that an anodic chamber 4 equipped with an anode 3 and a cathodic chamber 6 equipped with a cathode 5 are partitioned off by a cation-exchange membrane 7 (for example, Nafion 117, trade name, product of E. I. du Pont de Nemours & Co.). On the other hand, the second electrolytic cell 2 is so constructed that an anodic chamber 9 equipped with an anode 8 and a cathodic chamber 11 equipped with a cathode 10 are partitioned off by the same membrane 12 as the membrane 7.

To the top of the first electrolytic cell 1 is connected a raw water conduit 13 for feeding raw water containing a chloride such as sodium chloride or potassium chloride. The water conduit 13 branches off in two, and the distal ends thereof are separately connected to the tops of the anodic chamber 4 and the cathodic chamber 6. The bottom of the anodic chamber 4 of the first electrolytic cell 1 is connected to the top of the cathodic chamber 11 of the second electrolytic cell 2 through a connecting pipe 14, while the bottom of the cathodic chamber 6 of the first electrolytic cell 1 is connected to the top of the anodic chamber 9 of the second electrolytic cell 2 through a connecting pipe 15. Take-out pipes 16 and 17 are connected to the bottoms of the anodic chamber 9 and cathodic chamber 11 of the second electrolytic cell 2, respectively.

The anode 3 and cathode 5 in the first electrolytic cell 1 and the anode 8 and cathode 10 in the second electrolytic cell 2 are separately connected to electric power sources (not illustrated) in such a manner that predetermined voltage can be applied between the anode 3 and the cathode 5 or between the anode 8 and the cathode 10. Further, addition devices (not illustrated) for adding an aqueous solution of a chloride are separately provided on the water conduit 13, and the connecting pipes 14 and 15.

The ion-permeable membranes 7 and 12 may be in any form such as a woven fabric, nonwoven fabric or plastic film, and those having physical voids or pores or possessing a function that an electric charge can be transmitted and transferred like a solid electrolyte membrane are used. Examples of the membranes having physical voids or pores include microporous films of polymers such as polypropylene and polyethylene (for example, porous polyolefin film, "U-PORE", trade mark, product of UBE INDUSTRIES, LTD.), and nonwoven fabrics made of natural fibers or synthetic fibers. Typical examples of the membranes having a function that an electric charge can be transmitted and transferred include ion-exchange membranes.

The membranes 7, 12 are preferably ion-exchange membranes having alkali resistance, such as membranes of fluororesins, because a hydroxide such as caustic soda (NaOH) or caustic potash (KOH) is formed from the chloride contained in the raw water, such as sodium chloride or potassium chloride, on the cathodic side in the first electrolyzing step, so that the electrolytic solution becomes strongly alkaline. Examples of the fluororesins include perfluorosulfone resins.

In the apparatus illustrated in FIG. 1, the raw water containing the chloride is continuously fed to the anodic chamber 4 and cathodic chamber 6 of the first electrolytic cell 1 through the water conduit 13. The water fed to the cathodic chamber 6 is electrolyzed by voltage applied between the anode 3 and the cathode 5, while passing through the cathodic chamber 6, thereby preparing primary electrolyzed water on the cathodic side. The primary electrolyzed water on the cathodic side is then continuously taken out through the connecting pipe 15 and continuously fed to the anodic chamber 9 of the second electrolytic cell 2. The primary electrolyzed water obtained on the cathodic side is further electrolyzed by voltage applied between the anode 8 and the cathode 10 while passing through the anodic chamber 9, thereby preparing the electrolyzed functional water. The electrolyzed functional water is continuously taken out through the take-out pipe 16.

On the other hand, the raw water continuously fed to the anodic chamber 4 of the first electrolytic cell 1 is electrolyzed by the voltage applied between the anode 3 and the cathode 5 while passing through the anodic chamber 4, thereby preparing primary electrolyzed water on the anodic side. The primary electrolyzed water on the anodic side is then continuously taken out through the connecting pipe 14 and continuously fed to the cathodic chamber 11 of the second electrolytic cell 2. The primary electrolyzed water obtained on the anodic side is further electrolyzed by the voltage applied between the anode 8 and the cathode 10 while passing through the cathodic chamber 11, thereby preparing secondary electrolyzed water.

The secondary electrolyzed water contains chlorine and chlorine compounds such as hypochlorous acid produced by the first electrolysis, but its pH is changed to an alkaline pH by the second electrolysis in the cathodic chamber 11. Therefore, the chlorine compounds are stabilized to prepare a bleaching and sterilizing solution, which is a by-product of the electrolyzed functional water. The bleaching and sterilizing solution is continuously taken out through the take-out pipe 17.

In the first electrolytic cell 1, the anodic chamber 4 and the cathodic chamber 6 are partitioned by the ion-permeable membrane 7, so that the primary electrolyzed water on the anodic side and the primary electrolyzed water on the cathodic side are not mixed with each other though electric charges are mutually transferred. In the second electrolytic cell 2, the anodic chamber 9 and the cathodic chamber 11 are also partitioned by the ion-permeable membrane 12, so that the electrolyzed functional water and the bleaching and sterilizing solution are not mixed with each other.

In the apparatus illustrated in FIG. 1, tap water containing potassium chloride was continuously fed as the raw water through the raw water conduit 13 to conduct continuous electrolysis by applying voltage between the anode 3 and the cathode 5 in the first electrolytic cell 1 and between the anode 8 and the cathode 10 in the second electrolytic cell 2.

As a result, the electrolyzed functional water taken out through the take-out pipe 16 was found to contain hydrogen peroxide and have an oxidation-reduction potential of 600 to 1,100 mV, a pH of 6.4–9.6 and a concentration of residual chlorine of 5 to 12 ppm.

The electrolyzed functional water was added dropwise to a solution of potassium iodide (KI). As a result, the color of the solution turned brown, thereby confirming that iodine is isolated, and so the electrolyzed functional water has oxidizing ability. Besides, a solution of potassium permanganate ($KMnO_4$) was added dropwise to the electrolyzed functional water. As a result, the solution turned transparent, thereby confirming that a manganese ion ($Mn^{2+}$) is formed from a permanganate ion ($MnO_4^-$), and so the electrolyzed functional water has reducing ability. As a result, it was strongly suggested that the electrolyzed functional water has oxidizing ability and reducing ability against strong oxidizing agents such as a permanganate ion, and hence contains hydrogen peroxide. From an electrochemical point of view, a peak considered to be attributable to hydrogen peroxide was observed by cyclic voltammetry. Accordingly, it is considered that hydrogen peroxide is clearly formed.

Besides, the alkaline bleaching and sterilizing solution containing hypochlorous acid was taken out through the take-out pipe 17.

The electrolyzed functional water produced by the apparatus illustrated in FIG. 1 was then used to conduct a bactericidal test against Fusarium. Oxysporum. f. sp *cucumerinum Owen*. This test was conducted by preparing three suspensions containing Fusarium. Oxysporum. f. sp *cucumerinum Owen* at initial conidium densities of about $1\times10^6$ spores/ml, $1\times10^7$ spores/ml and $1\times10^8$ spores/ml, respectively, diluting the suspensions to 1/10 separately with the electrolyzed functional water and sterile water, and spreading these diluted suspensions on respective media to culture them for predetermined days, thereby comparing whether Fusarium. Oxysporum. f. sp *cucumerinum Owen* grew or not. The results are shown in the following Table 1.

TABLE 1

| | Initial conidium density (spores/ml) | | |
|---|---|---|---|
| | $1 \times 10^6$ | $1 \times 10^7$ | $1 \times 10^8$ |
| Electrolyzed functional water | ++ | + | ± |
| Sterile water | − | − | − |

++: Markedly effective (completely killed)
+: Effective (slightly grew)
±: Effective though not marked (grew at a visually countable level)
−: Ineffective (grew in such a great amount as to be visually uncountable)

It is apparent from Table 1 that no bactericidal effect is observed by the sterile water, while the electrolyzed functional water has a clear effect on Fusarium. Oxysporum. f. sp *cucumerinum Owen* at an initial conidium density of $1\times10^7$ spores/ml or lower and a considerable effect at an initial conidium density of $1\times10^8$ spores/ml or lower.

The second embodiment of the present invention will now be described.

Figure 2:
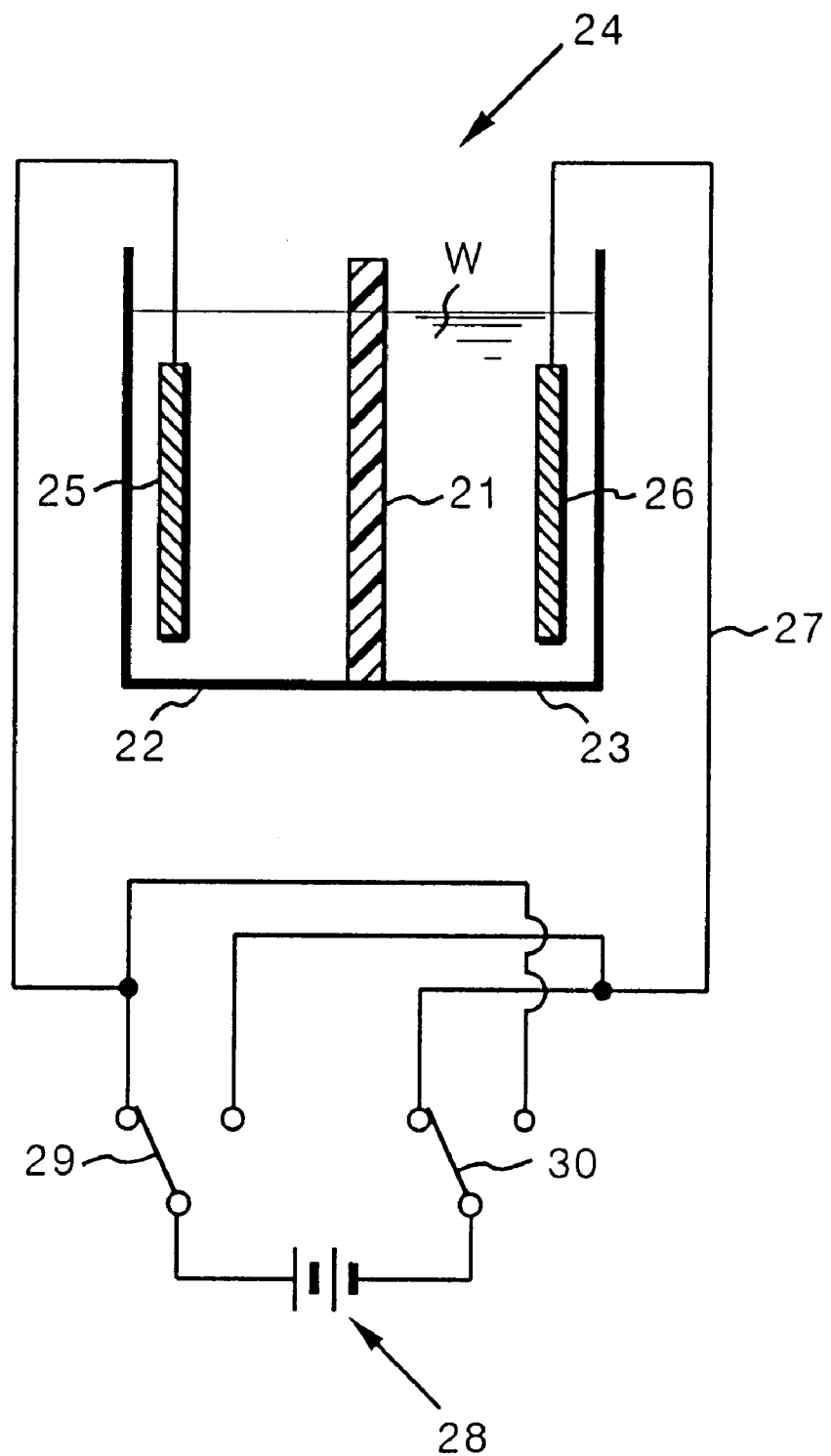
FIG. 2 is a cross-sectional view illustrating an example of the construction of an apparatus used in the production process according to the second aspect of the present invention.

This embodiment describes the second production process of the present invention. As illustrated in FIG. 2, an apparatus used in this production process includes an electrolytic cell 24 having two chambers 22 and 23 partitioned by a membrane 21 made of a cation-exchange membrane (for example, Nafion 117, trade name, product of E. I. du Pont de Nemours & Co.). Electrodes 25 and 26 obtained by carrying platinum on a titanium mesh base are provided in the chambers 22 and 23, respectively, and are connected to an electric power source 28 through a circuit 27. The electrodes 25, 26 are so constructed that their polarities can be changed over by switches 29 and 30 provided in the external circuit 27.

In the apparatus illustrated in FIG. 2, the electrodes 25, 26 were first connected to the electric power source 28 through the switches 29, 30 so as to use the electrodes 25 and 26 as an anode and a cathode, respectively, and raw water (tap water) W containing sodium chloride as an electrolyte was fed to the chambers 22, 23. Voltage of 5 V was then applied between the electrodes 25 and 26 to conduct first electrolysis in the predetermined quantity of electric charge.

Second electrolysis was then conducted under the same conditions as in the first electrolysis except that the switches 29, 30 were changed over, thereby reversing the polarities of electric currents applied to the electrodes 25, 26 so as to use the electrodes 25 and 26 as a cathode and an anode, respectively. As a result, the electrolyzed functional water containing hydrogen peroxide was obtained from the anodic side (the side of the chamber 23 and electrode 26) in the second electrolysis.

Physical properties of the electrolyzed water obtained on the anodic and cathodic sides in the above first and second electrolysis are shown in the following Table 2.

TABLE 2

| | | Anodic side | Cathodic side |
|---|---|---|---|
| First electrolysis | Oxidation-reduction potential (mV) | 1185 | −855 |
| | pH | 2.53 | 11.73 |
| | Concentration of residual chlorine (ppm) | 40 | 0.3 |
| Second | Oxidation- | 1106 | 52 |

TABLE 2-continued

|  |  | Anodic side | Cathodic side |
|---|---|---|---|
| electrolysis | reduction potential (mV) |  |  |
|  | pH | 9.85 | 9.60 |
|  | Concentration of residual chlorine (ppm) | 1.5 | 30 |

It is apparent from Table 2 that the electrolyzed functional water having high oxidation-reduction potential and low concentration of residual chlorine is obtained from the anodic side (the side of the chamber 23 and electrode 26) in the second electrolysis.

It was confirmed by the coloring of a potassium iodide solution and the decoloring of a potassium permanganate solution that the electrolyzed functional water obtained from the anodic side in the second electrolysis contains hydrogen peroxide.

After first electrolysis was then conducted under the same conditions as described above by means of the apparatus illustrated in FIG. 2, second electrolysis was performed by changing over the switches 29, 30 to reverse the polarities of electric currents applied to the electrodes 25, 26 so as to use the electrodes 25 and 26 as a cathode and an anode, respectively, and moreover changing the quantity of electric charge to 1.2 times, 1.5 times or 2.0 times as much as the quantity of electric charge used in the above second embodiment.

Physical properties of the electrolyzed functional water obtained from the anodic side (the side of the chamber 23 and electrode 26) in the second electrolysis are shown in the following Table 3.

TABLE 3

| Quantity of electric charge (times) | Oxidation-reduction potential (mV) | pH | Concentration of residual chlorine (ppm) |
|---|---|---|---|
| 1.0 (second embodiment) | 1106 | 9.85 | 1.5 |
| 1.2 | 1030 | 5.73 | 2.0 |
| 1.5 | 1018 | 3.54 | 2.0 |
| 2.0 | 1092 | 2.78 | 2.5 |

It is apparent from Table 3 that various kinds of electrolyzed functional water having different physical properties can be obtained by changing electrolytic conditions (such as quantity of electric charge) upon the second electrolysis. In particular, it is apparent that the pH of the electrolyzed functional water can be controlled over a wide range from an acidic pH to a weakly alkaline pH by controlling the quantity of electric charge as described above.

The electrolyzed functional water was then produced by using an apparatus in which the volume of each of the chambers 22, 23 in the electrolytic cell 24 illustrated in FIG. 2 was 2 liters, feeding tap water containing 0.8 g/liter (corresponding to 0.013 mol calculated as NaCl) of common salt as raw water, and applying 0.8 A of an electric current between the electrodes 25 and 26 at 27.2° C., thereby conducting first electrolysis and second electrolysis each for 25 minutes by constant-current electrolysis. Physical properties of the electrolyzed water obtained from the anodic and cathodic sides in the above first and second electrolysis are shown in the following Table 4.

TABLE 4

|  |  | Anodic side | Cathodic side |
|---|---|---|---|
| First electrolysis | Oxidation-reduction potential (mV) | 1066 | −865 |
|  | pH | 2.65 | 11.34 |
|  | Concentration of residual chlorine (ppm) | 7 | — |
| Second electrolysis | Oxidation-reduction potential (mV) | 252 | −65 |
|  | pH | 5.26 | 10.28 |
|  | Concentration of residual chlorine (ppm) | 5 | 6 |

Using the apparatus illustrated in FIG. 2, the electrolyzed functional water was then produced under the same conditions as in the case of Table 4. As a result, electrolyzed functional water having an oxidation-reduction potential of 160 mV, a pH of 6.01 and a concentration of residual chlorine of 6 ppm was obtained.

The electrolyzed functional water thus obtained was used to conduct a bactericidal test against various kinds of bacteria. In this bactericidal test, suspensions of a gram-positive bacterium (*Staphylococcus aureus* IFO 13276), a gram-negative bacterium (*Escherichia coli* ATCC 14621) and a spore bearing bacterium (*Bacillus subtilis* ATCC 6633, only spore) were separately inoculated into portions of the electrolyzed functional water obtained from the anodic side (the side of the chamber 23 and electrode 26) in the above second electrolysis so as to give cell counts of about $1 \times 10^3$ cells/ml, $1 \times 10^5$ cells/ml and $1 \times 10^7$ cells/ml, thereby preparing 3 samples every bacterium. Each of the samples was cultured at room temperature (25±2° C.). After 30 seconds, 1 minute and 10 minutes from the inoculation, 1 ml of each sample was taken out to count the number of viable cells (the number of colonies) by an agar plate dilution method (culture for 48 hours at 37° C. on a nutrient agar medium). The viable cell counts were determined by a usual counting method either visually or through a microscope (magnifier).

The results of the determination of viable cell counts are shown in Table 5. The numerical values shown in Table 5 are average values of 3 agar plates.

TABLE 5

|  | Quantity inoculated | Elapsed time after inoculation | | |
|---|---|---|---|---|
|  | (cells/ml) | 30 sec. | 1 min. | 10 min. |
| *Staphylococcus aureus* | $4.2 \times 10^3$ | 0 | 0 | 0 |
|  | $4.2 \times 10^5$ | 0 | 0 | 0 |
|  | $4.2 \times 10^7$ | 4 | 2 | 1 |
| *Escherichia coli* | $9.4 \times 10^3$ | 0 | 0 | 0 |
|  | $9.4 \times 10^5$ | 0 | 0 | 0 |
|  | $9.4 \times 10^7$ | $8.6 \times 10^2$ | $1.6 \times 10$ | 1 |
| *Bacillus subtilis* | $1.6 \times 10^3$ | $3.7 \times 10$ | $2.3 \times 10$ | 6 |
|  | $1.6 \times 10^5$ | $2.2 \times 10^4$ | $3.7 \times 10^3$ | 0 |
|  | $1.6 \times 10^7$ | $2.1 \times 10^6$ | $4.5 \times 10^5$ | $5.6 \times 10^4$ |

It is apparent from Table 5 that the electrolyzed functional water has sufficient bactericidal effects even after 30 seconds from the inoculation and hence has an immediate effect on the bacteria.

The third embodiment of the present invention will now be described.

Figure 3:
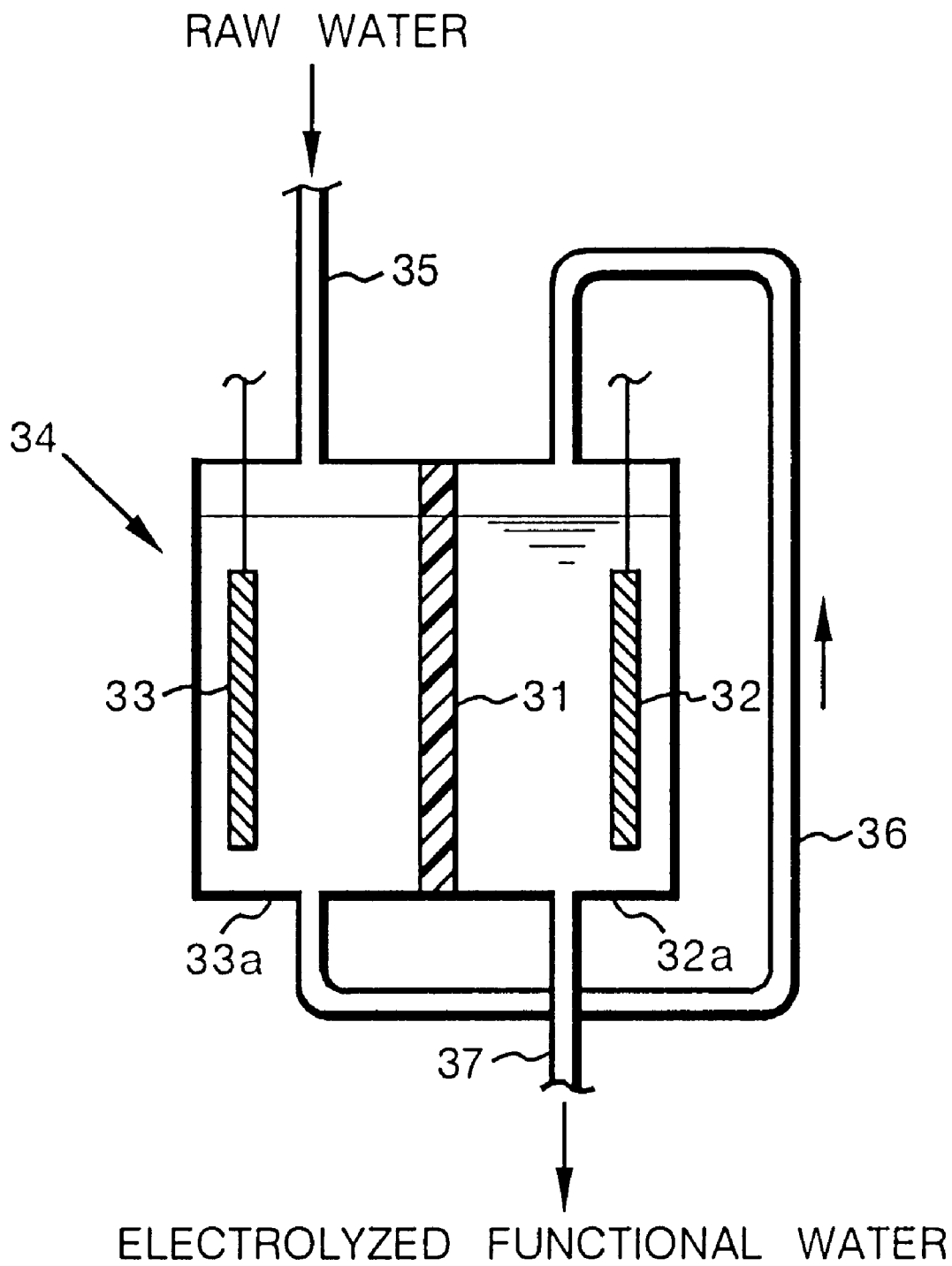
FIG. 3 is a cross-sectional view illustrating an example of the construction of an apparatus used in the production process according to the third aspect of the present invention.

This embodiment describes the third production process of the present invention and a production apparatus, which is suitable for use in this production process. As illustrated in FIG. 3, the production apparatus includes an electrolytic cell 34 equipped with an anode 32, a cathode 33 and an ion-permeable membrane 31 between them. The anode 32 and the cathode 33 are connected to a power source (not illustrated). The electrolytic cell 34 is provided with a raw water feeding conduit 35 for continuously feeding raw water containing a chloride such as sodium chloride or potassium chloride as electrolytes to the top of a cathodic chamber 33a, in which the cathode 33 is provided, and includes an electrolyzed water feeding conduit 36, which connects the bottom of the cathodic chamber 33a to the top of an anodic chamber 32a, in which the anode 32 is provided, and continuously feeds the electrolyzed water taken out from the cathodic chamber 33a to the anodic chamber 32a, and an electrolyzed functional water taking-out conduit 37 for continuously taking out electrolyzed functional water containing hydrogen peroxide from the bottom of the anodic chamber 32a.

The ion-permeable membrane 31 may be in any form such as a woven fabric, nonwoven fabric or plastic film (polymer film) as described above, and that having physical voids or pores or possessing a function that an electric charge can be transmitted and transferred like a solid electrolyte membrane is used. Examples of the membrane having a function that an electric charge can be transmitted and transferred include ion-exchange membranes. The membrane is preferably an ion-exchange membrane having alkali resistance such as a membrane of a fluororesin by the above-described reason.

Used as the anode 32 and the cathode 33 are electrodes made of a titanium base coated with platinum oxide or indium oxide. An electric current is applied to the anode 32 and the cathode 33 from a power source to electrolyze the water within the electrolytic cell 34.

In this embodiment, the raw water containing the chloride such as sodium chloride or potassium chloride is first fed to the cathodic chamber 33a through the raw water feeding conduit 35. When the raw water is filled in the cathodic chamber 33a, it is then fed to the anodic chamber 32a through the electrolyzed water feeding conduit 36. When both electrolytic chambers 32a, 33a are filled with the raw water, an electric current is applied to the anode 32 and the cathode 33 from a power source to initiate electrolysis.

By this electrolysis, hydrogen is generated and a hydroxide ion ($OH^-$) are generated by electrolysis mainly of the water in the cathodic chamber 33a, thereby obtaining alkaline electrolyzed water. In the anodic chamber 32a on the other hand, oxygen ($O_2$) and a hydrogen ion are generated by electrolysis mainly of the water at the initial stage of the electrolysis like electrolysis of water. However, at the same time, a chloride ion ($Cl^-$) derived from the electrolyte is oxidized into chlorine ($Cl_2$). As a result, acidic electrolyzed water containing chlorine is obtained in the anodic chamber 32a at the initial stage of the electrolysis and is taken out through the electrolyzed functional water taking-out conduit 37.

In this embodiment, the raw water is continuously fed to the cathodic chamber 33a through the raw water feeding conduit 35. When the electrolysis is continuously conducted, therefore, the alkaline electrolyzed water generated in the cathodic chamber 33a is fed to the electrolytic chamber 32a on the anodic side through the electrolyzed water feeding conduit 36, and the acidic electrolyzed water produced at the initial stage of the electrolysis in the anodic chamber 32a is replaced by the alkaline electrolyzed water produced in the cathodic chamber 33a.

When the electrolysis is further continued, the acidic electrolyzed water in the anodic chamber 32a is completely replaced by the alkaline electrolyzed water, and the alkaline electrolyzed water taken out of the cathodic chamber 33a is continuously fed to the anodic electrolytic chamber 32a after this, whereby the electrolyzed water is electrolyzed together with new raw water fed to the cathodic chamber 33a. At this stage, the same reaction as described above takes place in the cathodic chamber 33a, and so hydrogen and a hydroxide ion ($OH^-$) are generated, thereby obtaining alkaline electrolyzed water. In the anodic chamber 32a, however, the alkaline electrolyzed water is electrolyzed, whereby hydrogen peroxide ($H_2O_2$) and oxygen are generated from the hydroxide ion contained in the electrolyzed water. At this time, $Cl^-$ (chloride ion) contained in the alkaline electrolyzed water is simultaneously oxidized, whereby hypochlorous acid is generated as a chlorine component.

As a result, after the acidic electrolyzed water in the anodic electrolytic chamber 32a is completely replaced by the alkaline electrolyzed water, electrolyzed functional water containing hydrogen peroxide can be continuously taken out from the anodic chamber 32a through the electrolyzed functional water taking-out conduit 37.

Electrolysis was then performed by using an apparatus having the same construction as that illustrated in FIG. 3, in which the volume of each of the electrolytic chambers 32a and 33a was 20 liters, continuously feeding raw water containing 0.8 g/liter (corresponding to 0.013 mol calculated as NaCl) of common salt at a flow rate of 0.5 liter/min through the raw water feeding conduit 35, and applying 2.5 A of an electric current between the anode 32 and the cathode 33. As a result, acidic electrolyzed water formed in the anodic chamber 32a at the initial stage of the electrolysis was almost completely replaced by alkaline electrolyzed water formed in the cathodic chamber 33a in about 10 seconds after the initiation of the electrolysis. Electrolyzed functional water was stably obtained after about 30 seconds in view of the volume of the pipe arrangement. On and after this, the whole amount of the raw water fed through the raw water feeding conduit 35 was able to be taken out as the electrolyzed functional water containing hydrogen peroxide through the electrolyzed functional water taking-out conduit 37. No chlorine gas was detected during this electrolysis.

The pH just after the electrolysis, oxidation-reduction potential (ORP) against a silver-silver chloride standard electrode, and available residual chlorine concentration of the electrolyzed functional water produced under the electric current of 2.5 A are shown in Table 6.

Another electrolysis was then performed in the same manner as described above except that 20.0 A of an electric current was applied between the anode 32 and the cathode 33. The pH just after the electrolysis, oxidation-reduction potential against a silver-silver chloride standard electrode, and available residual chlorine concentration of the electrolyzed functional water produced under the electric current of 20.0 A are shown in Table 6.

TABLE 6

|  | Current upon electrolysis (A) | |
| --- | --- | --- |
|  | 2.5 | 20.0 |
| pH | 7.68 | 7.54 |
| oxidation-reduction potential (mV) | 415 | 709 |
| concentration of available residual chlorine (ppm) | 15 | 70 |

As apparent from Table 6, the production process of this embodiment can provide electrolyzed functional water containing hydrogen peroxide. When the case where the electric current was 2.5 A is compared with the case where the electric current was 20.0 A, it is understood that the concentration of the available residual chlorine becomes higher as the electric current increases, and the concentration of the available residual chlorine can be controlled by the electric current. The reason for this is that the oxidation reaction of water and the oxidation reaction of the chloride ion (Cl⁻) take place at the same time, and so the concentration of the available residual chlorine can be made high by increasing the intensity of the electric current.

The fourth embodiment of the present invention will be then described.

Figure 4:
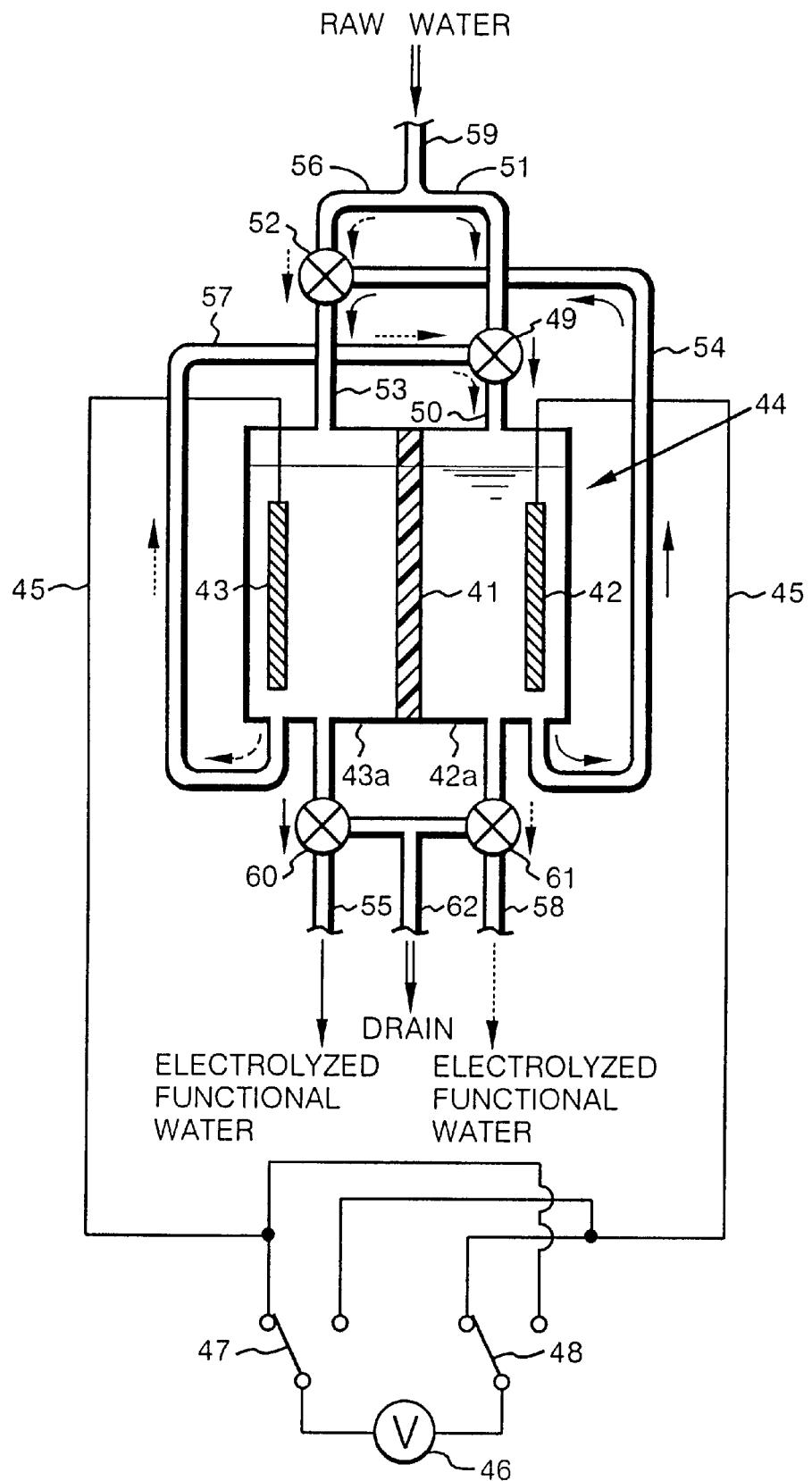
FIG. 4 is a cross-sectional view illustrating another example of the construction of the apparatus used in the production process according to the third aspect of the present invention.

This embodiment describes another embodiment of the production apparatus used in the third production process of the present invention. As illustrated in FIG. 4, this production apparatus includes an electrolytic cell 44 equipped with a first electrode 42, a second electrode 43 and an ion-permeable membrane 41 between them. The electrolytic cell 44 includes a first electrolytic chamber 42a, in which the first electrode 42 is provided, and a second electrolytic chamber 43a, in which the second electrode 43 is provided. Said both electrodes 42, 43 are connected to an external DC power source 46 through a circuit 45, and are so constructed that their polarities can be changed over by switches 47 and 48.

The electrolytic cell 44 is so constructed that a flow path for a raw water or electrolyzed water fed to the electrolytic chamber 42a or 43a can be changed over according to the polarities of the electrodes 42, 43, which are changed over by the switches 47, 48. A first flow path is adapted to the case where the first electrode 42 is a cathode, and is composed of a first raw water feeding conduit 51 for continuously feeding raw water containing a chloride such as sodium chloride or potassium chloride as an electrolyte to the top of the first electrolytic chamber 42a through a change-over valve 49 and a connecting pipe 50, a first electrolyzed water feeding conduit 54 for continuously feeding the electrolyzed water taken out from the bottom of the first electrolytic chamber 42a to the top of the second electrolytic chamber 43a through a change-over valve 52 and a connecting pipe 53, and a first electrolyzed functional water taking-out conduit 55 for continuously taking out electrolyzed functional water containing hydrogen peroxide from the bottom of the second electrolytic chamber 43a. On the other hand, a second flow path is adapted to the case where the second electrode 43 is a cathode, and is composed of a second raw water feeding conduit 56 for continuously feeding the raw water to the top of the second electrolytic chamber 43a through the change-over valve 52 and the connecting pipe 53, a second electrolyzed water feeding conduit 57 for continuously feeding the electrolyzed water taken out from the bottom of the second electrolytic chamber 43a to the top of the first electrolytic chamber 42a through the change-over valve 49 and the connecting pipe 50, and a second electrolyzed functional water taking-out conduit 58 for continuously taking out electrolyzed functional water containing hydrogen peroxide from the bottom of the first electrolytic chamber 42a.

In FIG. 4, the first flow path is illustrated by solid-line arrows, and the second flow path is illustrated by broken-line arrows. The common flow paths for the raw water and drain are illustrated by double-line arrows.

The first raw water feeding conduit 51 and the second raw water feeding conduit 56 branch off from a main raw water feeding conduit 59 on their upstream side. The first electrolyzed functional water taking-out conduit 55 and the second electrolyzed functional water taking-out conduit 58 are so constructed that they can be connected to a drain conduit 62 by changing over change-over valves 60 and 61 respectively provided in their way.

In the apparatus illustrated in FIG. 4, in the case where the first electrode 42 is used as a cathode by changing over the switches 47, 48, a flow path can be changed over to the first flow path (illustrated by the solid-line arrows in FIG. 4) by turning the change-over valve 49 so as to connect the first raw water feeding conduit 54 to the connecting pipe 50, turning the change-over valve 52 so as to connect the first electrolyzed water feeding conduit 54 to the connecting pipe 53, turning the change-over valve 60 so as to take out the electrolyzed functional water through the first electrolyzed functional water taking-out conduit 55, and closing the change-over valve 61. Then, the raw water is continuously fed through the first raw water feeding conduit 51 to conduct electrolysis, whereby hydrogen and a hydroxide ion (OH⁻) are generated by electrolysis mainly of the water in the first electrolytic chamber 42a to obtain alkaline electrolyzed water. In the second electrolytic chamber 43a on the other hand, oxygen (O₂) is generated and a hydrogen ion is formed by electrolysis mainly of the water at the initial stage of the electrolysis, and at the same time, a chloride ion (Cl⁻) derived from the electrolyte is oxidized into chlorine (Cl₂), whereby acidic electrolyzed water containing chlorine is obtained. When the electrolysis is continuously conducted to replace the acidic electrolyzed water formed at the initial stage of the electrolysis by the alkaline electrolyzed water formed in the first electrolytic chamber 42a, however, the alkaline electrolyzed water is electrolyzed in the second electrolytic chamber 43a, whereby hydrogen peroxide (H₂O₂) and oxygen are formed from the hydroxide ion contained in the electrolyzed water. At this time, Cl⁻ (chloride ion) contained in the alkaline electrolyzed water is simultaneously oxidized, whereby hypochlorous acid is formed as a chlorine component. As a result, after the acidic electrolyzed water in the second electrolytic chamber 43a is completely replaced by the alkaline electrolyzed water, electrolyzed functional water containing hydrogen peroxide can be continuously taken out from the second electrolytic chamber 43a through the first electrolyzed functional water taking-out conduit 55.

In the apparatus illustrated in FIG. 4, the polarities of said both electrodes 42, 43 are reversed to remove scale adhered to the electrodes 42, 43 after the electrolysis is continuously conducted for a predetermined period of time. In the case where the polarities are reversed by changing over the switches 47, 48 to use the second electrode 43 as a cathode, a flow path is changed over to the second flow path (illustrated by the broken-line arrows in FIG. 4) by turning the change-over valve 52 so as to connect the second raw water feeding conduit 56 to the connecting pipe 53, turning the change-over valve 49 so as to connect the second electrolyzed water feeding conduit 57 to the connecting pipe 50, turning the change-over valve 61 so as to take out the electrolyzed functional water through the second electrolyzed functional water taking-out conduit 58, and closing the change-over valve 60. Then, the raw water is continuously fed through the second raw water feeding conduit 56 to conduct electrolysis, whereby alkaline electrolyzed water is obtained in the second electrolytic chamber 43a in contrast with the case of the first flow path. In the first electrolytic chamber 42a, the acidic electrolyzed water containing chlorine is obtained at the initial stage of the electrolysis. After the acidic electrolyzed water is completely replaced by the alkaline electrolyzed water formed in the second electrolytic chamber 43a by continuing the electrolysis, electrolyzed functional water containing hydrogen peroxide can be continuously taken out from the first electrolytic chamber 42a through the second electrolyzed functional water taking-out conduit 58.

According to the apparatus illustrated in FIG. 4, therefore, the scale deposited to the electrodes 42, 43 can be removed by periodically reversing the polarities of the electrodes 42, 43 to prevent the successive decrease of electrolytic efficiency, and moreover the electrolyzed functional water containing hydrogen peroxide can be continuously taken out except for the initial stage of the electrolysis and just after the reversion of polarities.

In the apparatus illustrated in FIG. 4, after completion of the production of a predetermined amount of the electrolyzed functional water, the change-over valves 60, 61 are turned to connect the electrolyzed functional water taking-out conduits 55, 58 to the drain conduit 62, whereby the raw water or the electrolyzed water remaining in the electrolytic chamber 42a or 43a can be discharged through the drain conduit 62.

In the respective embodiments described above, the oxidation-reduction potential of the electrolyzed water formed considerably varies with the embodiments. However, the oxidation-reduction potential itself is not always directly taken as an index to the bactericidal effect because even if chemical species rich in oxidizing ability are present in plenty in a certain solution, the total oxidation-reduction potential appears low when a considerable number of chemical species low in oxidation-reduction potential is present in the solution.

In each of the above-described embodiments, the chloride is added as an electrolyte to the raw water fed to the electrolytic cell. However, the electrolyte is not limited to the chloride, and $Na_2SO_4$ and/or the like may be added to obtain electrolyzed water containing hydrogen peroxide from the anodic side in the second electrolyzing step like the case of the chloride. In this case, neither chlorine nor hypochlorous acid is present in the resultant electrolyzed water.

What is claimed is:

1. Strong oxidizing electrolyzed functional water containing hydrogen peroxide, hydroxide radical and a low concentration of chlorine, which is produced by a process comprising the steps of:
    feeding water containing chloride as electrolyte to a first electrolytic cell equipped with an anode, a cathode and an ion-permeable membrane between the anode and the cathode to separate the cell into an anodic side and a cathodic side;
    a first electrolyzing of the water in the electrolytic cell; and
    a second electrolyzing of the electrolyzed water obtained from the cathodic side of said electrolytic cell at an anodic side of a second electrolytic cell equipped with an anode, a cathode and an ion-permeable membrane between the anode and the cathode to separate the cell into the anodic side and a cathodic side.

2. The strong oxidizing electrolyzed functional water according to claim 1, wherein the chloride contained in the water is sodium chloride or potassium chloride in a range of about 0.001 to 0.013 mol/liter in NaCl equivalents.

3. The strong oxidizing electrolyzed functional water according to claim 1, wherein the concentration of the chlorine contained in the strong oxidizing electrolyzed functional water is less than about 15 ppm.

4. The strong oxidizing electrolyzed functional water according to claim 1, wherein pH of the strong oxidizing electrolyzed functional water is in a range between about 3.5 and 10.5.

5. A process for producing strong oxidizing electrolyzed functional water containing hydrogen peroxide, hydroxide radical and a low concentration of chlorine, which comprises:
    a first electrolyzing step of continuously feeding water containing chloride as electrolyte to a first electrolytic cell equipped with an anode, a cathode and an ion-permeable membrane between the anode and the cathode to separate the cell into an anodic side and a cathodic side;
    a second electrolyzing step of providing a second electrolytic cell equipped with an anode, a cathode and an ion-permeable membrane between the anode and the cathode to separate the cell into an anodic side and a cathodic side;
    continuously taking out the electrolyzed water obtained on the cathodic side of the first electrolytic cell;
    continuously feeding the electrolyzed water to the anodic side of the second electrolytic cell, thereby electrolyzing it; and
    a step of continuously taking out electrolyzed functional water containing hydrogen peroxide, hydroxide radical and a low concentration of chlorine from the anodic side of the second electrolytic cell.

6. The process according to claim 5, wherein in the second electrolyzing step, electrolyzed water obtained on the anodic side of the first electrolytic cell is continuously taken out to continuously feed it to the cathodic side of the second electrolytic cell, thereby electrolyzing it.

7. The process according to claim 5, wherein the chloride contained in the water is at least one selected from the group consisting of sodium chloride and potassium chloride, so that the chloride is present in a range from about 0.001 to 0.013 mol/liter in NaCl equivalents.

8. The process according to claim 5, wherein the process includes a step of controlling current density of electrolysis to adjust pH of the strong oxidizing electrolyzed functional water between about 3.5 and 10.5.

9. A process for producing strong oxidizing electrolyzed functional water containing hydrogen peroxide, hydroxide radical and a low concentration of chlorine, which comprises:
    a first electrolyzing step of feeding water containing chloride as electrolyte to an electrolytic cell equipped with an anode, a cathode and an ion-permeable membrane between the anode and the cathode to separate the cell into an anodic side and a cathodic side;
    a second electrolyzing step of reversing polarities of electric currents applied to the anode and cathode in said electrolytic cell after completion of the first electrolyzing step to conduct electrolysis again; and a step of taking out strong oxidizing electrolyzed functional water containing hydrogen peroxide, hydroxide radical and a low concentration of chlorine from the anodic side in the second electrolyzing step.

10. The process according to claim 9, wherein the chloride contained in the water is at least one selected from the group consisting of sodium chloride and potassium chloride, so that the chloride is present in a range from about 0.001 to 0.013 mol/liter in NaCl equivalents.

11. The process according to claim 9, wherein the process includes a step of controlling current density of electrolysis to adjust pH of the strong oxidizing electrolyzed functional water between about 3.5 and 10.5.

12. A process for producing the strong oxidizing electrolyzed functional water containing hydrogen peroxide, hydroxide radical and a low concentration of chlorine, which comprises:

a step of providing an electrolytic cell equipped with an anode, a cathode and an ion-permeable membrane between the anode and the cathode to separate the cell into an anodic side and a cathodic side;

continuously feeding water containing chloride as electrolytes to the cathodic side of the electrolytic cell;

a step of completely replacing electrolyzed water in the anodic side of the electrolytic cell with the electrolyzed water taken from the cathodic side of the electrolytic cell;

a step of continuously taking out the electrolyzed water from the cathodic side of the electrolytic cell to feed it to the anodic side of the electrolytic cell, whereby the electrolyzed water is electrolyzed together with new water fed to the cathodic side; and a step of continuously taking out strong oxidizing electrolyzed functional water containing hydrogen peroxide, hydroxide radical and a low concentration of chlorine.

13. The process according to claim 12, wherein the chloride contained in the water is at least one selected from the group consisting of sodium chloride and potassium chloride, so that the chloride is present in a range from about 0.001 to 0.013 mol/liter in NaCl equivalents.

14. The process according to claim 12, wherein the process includes a step of controlling current density of electrolysis to adjust pH of said electrolyzed functional water to between about 3.5 and 10.5.

15. An apparatus for producing electrolyzed functional water, which comprises:

an electrolytic cell equipped with first and second electrodes and an ion-permeable membrane between them, the polarities of said electrodes being reversible;

a first flow path composed of a first water feeding means for feeding water containing chloride as electrolytes to the side of the first electrode continuously when the first electrode is used as a cathode, a first electrolyzed water feeding means for feeding the electrolyzed water from the side of the first electrode to the side of the second electrode continuously, and a first electrolyzed functional water taking-out means for taking out electrolyzed functional water from the side of the second electrode continuously;

a second flow path composed of a second water feeding means for feeding water containing chloride as electrolytes to the side of the second electrode continuously when the second electrode is used as a cathode, a second electrolyzed water feeding means for feeding the electrolyzed water from the side of the second electrode to the side of the first electrode continuously, and a second electrolyzed functional water taking-out means for taking out electrolyzed functional water from the side of the first electrode continuously; and a change-over means for changing a flow path over to the first flow path when the first electrode is used as a cathode or over to the second flow path when the second electrode is used as a cathode.

16. The apparatus according to claim 15, wherein the electrolytic cell is filled with water containing sodium chloride or potassium chloride in a range from about 0.001 to 0.013 mol/liter in NaCl equivalents.

* * * * *